US008603371B2

(12) United States Patent
Etori

(10) Patent No.: US 8,603,371 B2
(45) Date of Patent: Dec. 10, 2013

(54) METHOD FOR PRODUCING SURFACE CONVEXES AND CONCAVES

(75) Inventor: Hideki Etori, Saitama (JP)

(73) Assignee: Kimoto Co., Ltd., Saitama-shi, Saitama (JP)

( * ) Notice: Subject to any disclaimer, the term of this patent is extended or adjusted under 35 U.S.C. 154(b) by 748 days.

(21) Appl. No.: 12/225,305

(22) PCT Filed: Mar. 26, 2007

(86) PCT No.: PCT/JP2007/056162
§ 371 (c)(1),
(2), (4) Date: Sep. 18, 2008

(87) PCT Pub. No.: WO2007/116671
PCT Pub. Date: Oct. 18, 2007

(65) Prior Publication Data
US 2010/0230839 A1    Sep. 16, 2010

(30) Foreign Application Priority Data
Mar. 30, 2006 (JP) .................................. 2006-093394

(51) Int. Cl.
*B29D 11/00* (2006.01)
(52) U.S. Cl.
USPC ........................................................ 264/2.5
(58) Field of Classification Search
CPC ................................................. B29D 11/00346
USPC ........................................................ 264/2.5
See application file for complete search history.

(56) References Cited

U.S. PATENT DOCUMENTS

| 5,066,099 A | * | 11/1991 | Yoshida et al. | ............... 359/457 |
| 2004/0009413 A1 | * | 1/2004 | Lizotte | ........................... 264/2.5 |
| 2006/0221313 A1 | * | 10/2006 | Kitaguchi | ..................... 353/122 |

FOREIGN PATENT DOCUMENTS

| JP | 06-130205 | 5/1994 |
| JP | 2000-103062 | 4/2000 |
| JP | 2004-046139 | 2/2004 |
| JP | 2004-294745 | 10/2004 |
| JP | 2004-310077 | 11/2004 |
| JP | 2005-062625 | 3/2005 |
| WO | WO 2004/021052 | 3/2004 |
| WO | WO 2004102270 A1 * | 11/2004 |

* cited by examiner

*Primary Examiner* — Yogendra Gupta
*Assistant Examiner* — Alison Hindenlang
(74) *Attorney, Agent, or Firm* — Bacon & Thomas, PLLC

(57) ABSTRACT

A method for producing surface convexes and concaves enabling easy and highly precise formation of desired convex and concave shapes using a photomask is provided. A mask member 20 having light transmitting sections and non-light transmitting sections is disposed over one side of a photosensitive film 10 consisting of a photosensitive resin composition with a light diffusing layer 30 disposed between the mask member 20 and the photosensitive film 10. Light is irradiated from a light source disposed on the side of the mask member 20 to expose the photosensitive film 10 through the light transmitting sections of the mask member 20, and exposed portions or unexposed portions of the photosensitive film 10 are removed by development to produce convexes and concaves on the photosensitive film 10 in shapes determined by shapes of the exposed portions or unexposed portions. In the light exposure, light exposure conditions such as haze of the light diffusing layer 30 are controlled so as to control the shapes of the exposed portions or unexposed portions.

11 Claims, 7 Drawing Sheets

METHOD FOR PRODUCING SURFACE CONVEXES AND CONCAVES

TECHNICAL FIELD

The present invention relates to a method for producing fine convexes and concaves, in particular, a method for producing surface convexes and concaves suitable for the manufacture of optical members having convexes and concaves on surfaces of transparent materials such as light diffusing plates, light control films and microlenses.

BACKGROUND ART

In various optical apparatuses, screens and displaying apparatuses such as liquid crystal displays, used are optical members such as light diffusing films and microlenses, in which fine convexes and concaves are provided on surfaces in order to control projection directions of transmitted light or reflected light. As such optical members, not those simply having random convexes and concaves, but those having concaves and convexes of which shapes, intervals and so forth are highly precisely defined in order to control light paths have been proposed (Patent document 1).

Generally employed as techniques for providing convexes and concaves on surfaces of materials are chemical matting in which a matting agent is mixed in a layer forming a surface, embossing, impressing and so forth. However, in the chemical matting, the matting agent itself has particle size distribution, and in addition, dispersion state thereof is not also completely uniform. Therefore, surface profiles having regularity or highly precisely defined surface profiles cannot be formed. Further, in the cases of embossing and impressing, although production of molds may be difficult depending on shapes of convexes and concaves, they have an advantage that if a mold is once produced, surface convexes and concaves can be easily formed thereafter. However, the same surface convexes and concaves cannot necessarily be formed even with the same mold depending on properties of materials, pressures at the time of pressing and so forth, and it is difficult to form convexes and concaves with good reproducibility on any materials.

There are also proposed methods of producing light diffusing plates or microlenses utilizing photolithography, which is a common technique in the manufacture of semiconductor devices and so forth (Patent documents 2 and 3). In the technique disclosed in Patent document 3, a gray scale mask pattern is used to control thickness of photosensitive film to be solubilized by light exposure, and thereby produce microlenses having convexes of desired shapes. The gray scale mask is a mask in which light transmission distribution is formed by providing a pattern of tones, and a gray scale mask of which light transmission is controlled by changing size or numbers of apertures provided in the mask film is disclosed in Patent document 3.

Patent document 1: International Patent Publication WO2004/021052
Patent document 2: Japanese Patent Unexamined Publication (KOKAI) No. 2004-294745
Patent document 3: Japanese Patent Unexamined Publication (KOKAI) No. 2004-310077

DISCLOSURE OF THE INVENTION

Object to be Achieved by the Invention

However, in a gray scale mask of which light transmission is controlled based on size and number of apertures, many apertures of which pitches and sizes are controlled must be provided in a small region in order to form one convex or concave, and even when a reduction projection type light exposure apparatus is used, extremely precise processing is required for the mask. Moreover, in order to form convex and concave shapes as a continuous curved surface with no steps, it is necessary to perform multiplex light exposure using multiple kinds of masks, and thus the process of convex and concave formation becomes complicated.

Therefore, an object of the present invention is to provide a method enabling easy and highly precise formation of desired convex and concave shapes using a usual photomask without using a gray scale mask.

Means for Achieving the Object

The method for producing surface convexes and concaves of the present invention is a method for producing fine convexes and concaves on a surface of a material, which comprises the step of disposing a mask member having light transmitting sections and non-light transmitting sections over one side of a photosensitive film consisting of a photosensitive resin composition with an interval with respect to the photosensitive film, the step of disposing a light diffusing layer between the mask member and the photosensitive film, the step of exposing the photosensitive film to light from a light source disposed on the side of the mask member through the light transmitting sections of the mask member, and the step of removing exposed portions or unexposed portions of the photosensitive film by development to produce convexes and concaves on the photosensitive film in shapes determined by shapes of the exposed portions or unexposed portions, wherein, in the step of exposing the photosensitive film to light, light exposure conditions are controlled so as to control the shapes of the exposed portions or unexposed portions.

In the method for producing surface convexes and concaves of the present invention, the light exposure conditions may include haze (JIS K7136:2000) of the light diffusing layer.

In the method for producing surface convexes and concaves of the present invention, the light exposure conditions may include distance from a surface of the light diffusing layer on the photosensitive film side to the photosensitive film, and/or distance from light-shielding surface of the mask member to the photosensitive film.

Moreover, in the method for producing surface convexes and concaves of the present invention, the light diffusing layer may consist of spherical microparticles and a binder resin, and mean particle diameter of the spherical microparticles may be 1/10 or less of mask diameter of the mask member.

Further, in the method for producing surface convexes and concaves of the present invention, the photosensitive film may consist of a negative type photosensitive resin composition which is insolubilized by light exposure.

Further, in the method for producing surface convexes and concaves of the present invention, the photosensitive film is preferably formed on or disposed in contact with a substantially transparent substrate, and the light exposure is preferably performed from the side of the substrate.

Further, in the method for producing surface convexes and concaves of the present invention, after the step of light exposure, the surface of the photosensitive film on the mask member side may be adhered to another substrate, and then development may be performed to produce a surface having convexes and concaves on the substrate.

The method for producing surface convexes and concaves of the present invention may be a method for producing a member having surface convexes and concaves by using a mold having fine surface convexes and concaves so that the member should have surface convexes and concaves in shapes complementary to shapes of the surface convexes and concaves of the mold, wherein a mold produced by the aforementioned method for producing surface convexes and concaves of the present invention is used as the mold.

Further, the method for producing surface convexes and concaves of the present invention may be a method for producing a member having surface convexes and concaves by using a mold having fine surface convexes and concaves so that the member should have surface convexes and concaves in shapes complementary to shapes of the surface convexes and concaves of the mold, wherein a second mold produced by using a first mold produced by the aforementioned method for producing surface convexes and concaves of the present invention is used as the mold to produce a member having surface convexes and concaves in the same shapes as those of the first mold.

Further, in the method for producing surface convexes and concaves of the present invention, the member on which surface convexes and concaves are formed is preferably an optical member.

The method for producing surface convexes and concaves of the present invention may also be a method for producing fine convexes and concaves on a surface of a material, which comprises the step of disposing a mask member having light transmitting sections and non-light transmitting sections over one side of a photosensitive film consisting of a photosensitive resin composition with an interval with respect to the photosensitive film and disposing a light diffusing layer between the mask member and the photosensitive film, the step of exposing the photosensitive film to light from a light source disposed on the side of the mask member through the light transmitting sections of the mask member, and the step of removing exposed portions or unexposed portions of the photosensitive film by development to produce convexes and concaves on the photosensitive film in shapes determined by shapes of the exposed portions or unexposed portions.

In the method for producing surface convexes and concaves of the present invention, as an embodiment, the distance from light-shielding surface of the mask member to the photosensitive film may be one-dimensionally or two-dimensionally changed with respect to the photosensitive film. Alternatively, the distance from the surface of the light diffusing layer on the photosensitive film side to the photosensitive film may be one-dimensionally or two-dimensionally changed with respect to the photosensitive film. Further, thickness of the light diffusing layer may be one-dimensionally or two-dimensionally changed with respect to the light diffusing layer itself.

In the present invention, light includes not only visible lights but also lights of shorter wavelength such as ultraviolet rays and far ultraviolet rays.

Hereafter, the concept of the present invention will be explained.

In photolithography aiming at forming convexes and concaves in a certain film thickness such as photolithographic platemaking, in order to accurately reproduce a mask pattern, it is required that light used for light exposure should consist of parallel rays. Also in the conventional methods for producing surface convexes and concaves using a gray scale mask, distribution is imparted to light exposure of the exposed portions by controlling light transmittance of the mask on the assumption that the light consists of parallel rays.

Further, for formation of special convex and concave shapes in which height of the convex (film thickness) is high, a technique is also proposed in which resist (photosensitive film) is formed on a transparent substrate, and light exposure is performed from the substrate side (back side) in order to prevent underexposure and underdevelopment (Patent document 4). However, in order to prevent collapse of edge shapes of the exposed portions of the resist due to diffraction of light, the mask is generally placed in contact with the resist.

Patent document 4: Japanese Patent Unexamined Publication (KOKAI) No. 2000-103062

On the other hand, in the method for producing surface convexes and concaves of the present invention, although parallel rays are used, a mask member and a photosensitive film (resist) are not disposed in contact with each other, but the mask is disposed with an interval, a light diffusing layer is further disposed between the mask member and the photosensitive film, and spread of light diffused by the light diffusing layer is utilized to impart distribution to the light exposure.

That is, as shown in FIG. 1, when light is irradiated to a photosensitive film 10 through a mask member 20, the light which passes through an aperture of the mask member 20 and reaches a light diffusing layer 30 is diffused and slightly spreads compared with the diameter of the aperture. The spread of light is enlarged according to haze value H of the light diffusing layer 30, which results in decrease in amount of light or the like in peripheral portions of light flux to impart distribution of light exposure.

Moreover, in the method for producing surface convexes and concaves of the present invention, diffraction of light occurring depending on the distance from light-shielding surface of the mask member to light entering surface of the photosensitive film and spread of light diffused by the light diffusing layer depending on the distance from the surface of the light diffusing layer on the photosensitive film side to the photosensitive film are utilized to impart distribution to the light exposure.

That is, as shown in FIG. 2, when light is irradiated to a photosensitive film 10 through a mask member 20, the light which passes through an aperture of the mask member 20 is diffracted and slightly spreads compared with the diameter of the aperture. When light is irradiated from the back side of the substrate applied with the photosensitive film 10, the spread of light caused by diffraction is expanded depending on the distance T between light-shielding surface of the mask member 20 and the photosensitive film, and amount of light decreases in peripheral portions of the light flux. On the way of the light, the light reaching the light diffusing layer 30 is diffused in a haze value H-dependent manner, the spread of light is expanded depending on the distance t from the surface of the light diffusing layer on the photosensitive film side to the photosensitive film 10, and amount of light decreases in peripheral portions of the light flux to impart distribution of light exposure.

As described above, distribution is imparted to exposure of light entering into the photosensitive film by spread of light. This distribution of light exposure depends on the haze H of the light diffusing layer, the distance t from the surface of the light diffusing layer on the photosensitive film side to the photosensitive film, and the distance T from the light-shielding surface of the mask member to the photosensitive film.

Light exposure required for insolubilization of a photo-curing resin (resist) by photo-curing is called critical light exposure $E_c$, and it is known that there is a relation represented by the following equation between curing depth $C_d$ and critical light exposure $E_c$ when the photo-curing resin is exposed to a predetermined light exposure $E_0$.

$$Cd = Dp \times \ln(E0/Ec) \quad (1)$$

In the equation, Dp represents a depth at which intensity of ultraviolet ray irradiated on the resin surface becomes 1/e (it is called penetration depth), and Dp is a value characteristic to each resin.

Therefore, when light which produces light exposure distribution is irradiated, curing depth distribution is produced corresponding to the light exposure distribution, and as a result, it becomes possible to form convexes or concaves each having a height or depth distribution. In the present invention, by controlling light exposure distribution using haze H of the light diffusing layer (henceforth also referred to simply as "haze H"), formation of desired surface convexes and concaves is enabled. Preferably, by controlling the haze H, the distance t from the surface of the light diffusing layer on the photosensitive film side to the photosensitive film (henceforth also referred to simply as "distance t"), and/or the distance T between light-shielding surface of the mask member and the photosensitive film (henceforth also referred to simply as "distance T") to control light exposure distribution, formation of desired surface convexes and concaves is enabled.

Effect of the Invention

According to the present invention, a desired convex and concave pattern can be produced with high precision by controlling the conditions of light exposure without using multiplex light exposure, or light exposure using a gray scale mask or the like.

BEST MODE FOR CARRYING OUT THE INVENTION

Embodiments of the present invention will be explained hereafter.

The outline of the method for producing surface convexes and concaves of the present invention is shown in FIG. 3. The method for producing surface convexes and concaves of the present invention mainly comprises the step of preparing a photosensitive film 10 consisting of a photosensitive resin composition which is cured or solubilized by light exposure (a), the light exposure step of exposing the photosensitive film 10 to light through a mask member 20 and a light diffusing layer 30(b), and the development step of developing the photosensitive film 10 to remove exposed portions or unexposed portions (c).

In the light exposure step, the mask member 20 is disposed with a predetermined interval with respect to the photosensitive film 10, the light diffusing layer 30 is disposed at a position in the interval between light-shielding surface of the mask member 20 and the photosensitive film 10, and then light from a light source 40 is irradiated on the photosensitive film 10 through apertures of the mask member 20 to perform light exposure, as shown in FIG. 3(b). In the drawings, although the photosensitive film 10 is formed on a substrate 11, the substrate 11 is not indispensable. In the development step, the photosensitive film 10 is developed to remove exposed portions or unexposed portions and thereby form convexes or concaves 15, of which shapes are determined by the shapes of exposed portions or unexposed portions, on the photosensitive film. Then, portions of the photosensitive film not removed and remained are cured (insolubilized) as required. In the method for producing surface convexes and concaves of the present invention, the shapes of the convexes and concaves are controlled by appropriately choosing the haze H, preferably haze H, distance t, and/or distance T.

Although the haze H of the light diffusing layer should differ depending on the objective concave or convex shape, it is preferably controlled to be 60% or less, more preferably 5 to 50%. A smaller haze provides a higher aspect ratio of exposed portion (ratio of height to width of bottom), and can provide a higher convex shape in the case of a negative type photosensitive film in which exposed portions are insolubilized to provide convex shapes, or a deeper concave shape in the case of a positive type photosensitive film in which exposed portions are solubilized to provide concave shapes.

As for the distance T from the light-shielding surface of the mask member to the photosensitive film, although it depends on objective convex and concave shapes, when the convexes and concaves have sizes (height and width of bottom) of from submicron order to several hundreds of microns order, and the refractive index of the medium existing between the light-shielding surface of the mask member to the photosensitive film is represented by N, T/N is preferably 2 mm or smaller, more preferably 5 μm or larger and 1 mm or smaller. The distance T is divided with the refractive index N, because the wave number becomes larger as the refractive index becomes larger, and the wave number needs to be the same in order to obtain the same effect of the spread of light. In the design of the same convex and concave shapes, when a medium of a smaller refractive index exists, for example, the interval (thickness of the material) should be thinner compared with the case where a higher refractive index medium exists. Further, when two or more kinds of media exist (for example, when two kinds of media of the light diffusing layer and the substrate 11 exist as shown in FIG. 3(b)), it is sufficient that T1/N1+T2/N2+ . . . should be within the aforementioned range, wherein T1, T2 . . . and N1, N2, . . . represent thicknesses and refractive indexes of the media, respectively. The refractive index of the light diffusing layer means a refractive index of binder used for the light diffusing layer.

Further, the distance T does not need to be constant, and one-dimensional or two-dimensional gradient may be imparted to the distance depending on objective distribution of convexes or concaves, or it is also possible to change the distance T itself depending on positions thereof.

Further, as for the distance t from the surface of the light diffusing layer on the photosensitive film side to the photosensitive film, although it depends on objective convex and concave shapes, when the convexes and concaves have sizes (height and width of bottom) of from submicron order to several hundreds of microns order, and the refractive index of the medium existing between the surface of the light diffusing layer on the photosensitive film side and the photosensitive film is represented by n, t/n is preferably 2 mm or smaller, more preferably 5 μm or larger and 1 mm or smaller. The distance t is divided with the refractive index n, because the wave number becomes larger as the refractive index becomes larger, and the wave number needs to be the same in order to obtain the same effect of the spread of light. In the design of the same convex and concave shapes, when a medium of a smaller refractive index exists, for example, the interval (thickness of the material) should be thinner compared with the case where a higher refractive index medium exists. Further, when two or more kinds of media exist, it is sufficient that t1/n1+t2/n2+ . . . should be within the aforementioned range, wherein t1, t2 . . . and n1, n2, . . . represent thicknesses and refractive indexes of the media, respectively.

Further, the distance t does not need to be constant, and one-dimensional or two-dimensional gradient may be imparted to the distance depending on objective distribution of convexes or concaves, or it is also possible to change the distance t itself depending on positions thereof.

The shape of the aperture of the mask is not limited to a circular shape, and it may have an arbitrary shape. For example, when the aperture of the mask has a slit shape, the concave or convex should have an elongated shape. Further, arrangement and pitches of the convexes and concaves are determined by arrangement and pitches of the apertures formed in the mask.

Relationship between the light exposure conditions described above (haze H, distance t, and distance T) and concave or convex shape will be explained with reference to the specific examples shown in FIGS. 4 to 6. The results shown in FIGS. 4 to 6 were obtained by using a negative type photosensitive resin and two kinds of masks having circular apertures of 30 μm or 40 μm (mask diameter), and light exposure used for forming the convex shapes was 100 mJ/cm$^2$ for all the cases. The unit is "μm" for the vertical axis and horizontal axis of all the graphs shown in FIGS. 4 to 6.

FIG. 4 shows convex shapes obtained with variable haze H, fixed distance t of 50 μm (t/n=30 μm) and fixed distance T of 105 μm (T/N=64 μm). FIG. 5 shows convex shapes obtained with variable distance t (t/n), fixed distance T of 205 μm (T/N=125 μm) and fixed haze H of 26%. FIG. 6 shows convex shapes obtained with variable distance T (T/N), fixed distance t of 50 μm (t/n=30 μm) and fixed haze H of 16%.

As shown in FIG. 4, when the haze H was changed with fixing the distance t (t/n) and distance T (T/N), as the value of haze became larger, spread of light became larger, and the height and slope of the obtained convex shape became lower and longer, respectively, with increase of the value of haze H.

Further, as shown in FIG. 5, when the distance t (t/n) was changed with fixing the haze H and the distance T (T/N), as the distance t (t/n) became longer, spread of light becomes larger, and height of the obtained convex shape became slightly lower. It is considered that as the distance t (t/n) became longer, slope of convex should become longer. However, it is considered that, in the results shown in FIG. 5, when the distance t was 200 μm (t/n=122 μm), the amount of light decreased at peripheral portions of light flux due to diffusion etc., and did not reach the critical light exposure at portions around the end of slope, therefore end portion of the slope was not formed, and thus the slope was not so long as that formed with a distance t of 50 μm or 100 μm (t/n=30 μm or 61 μm).

Moreover, it can be seen from the results shown in FIG. 6 that, when value of the distance T (T/N) was changed with fixing the haze H and the distance t (t/n), convex shape to be obtained changed depending on the mask diameter. When the mask diameter was 30 μm, the peak of the convex markedly tended to be more sharpened with increase of the distance T (T/N). Moreover, height of the convex increased until the distance T reached 605 μm (T/N=564 μm), but decreased when the distance T exceeded that length. On the other hand, when the mask diameter was 40 μm, although the peak sharpening tendency of the convex was also seen as in the case of the mask diameter of 30 μm, height of the convex once decreased at distance T=355 μm (T/N=314 μm), but increased with the larger values of T. These phenomena can be explained on the basis of diffraction of light passing through the circular aperture of the mask. FIG. 7 shows distributions of calculated intensities of transmitted light at positions of various distances T (T/N) observed with parallel light of a wavelength of 365 nm projected on the mask surface at right angle and passing through the circular aperture of the mask having a diameter of 30 μm or 40 μm. The horizontal axis represents the distance (μm) from the center of the circular aperture, at which the distance is 0. The vertical axis represents intensity of the transmitted light based on the intensity of the parallel light at the time of passing through the aperture of the mask, which is taken as 1. As seen from the results shown in FIG. 7, the light intensity distribution greatly differs depending on values of the distance T (T/N). Moreover, the light intensity distribution changing tendency differs depending on the mask diameter. In comparison of the results shown in FIGS. 6 and 7, although the slopes of the convexes shown in FIG. 6 are longer than the calculated values shown in FIG. 7 due to larger spread of light caused by influence of the light diffusing layer disposed between the mask and the resist, the convex peak shape sharpening tendency depending on the value of the distance T (T/N) and the convex height changing tendency show good agreement with the light intensity distribution profiles based on calculated values, and they show that the convex shape changing tendency depends on influence of diffraction of light.

Specific examples of convex portions obtained with a circular aperture of the mask are shown in FIG. 8 (three-dimensional shapes), which are different in shape and aspect ratio (ratio of height to bottom width of convex). Although single convexes are shown in the drawings as examples, multiple fine convexes are formed by using a mask having multiple fine apertures (light transmitting sections).

As described above, in the method for producing surface convexes and concaves of the present invention, sectional shape and aspect ratio (ratio of height to bottom width of convex) of convex or concave can be controlled by adjusting the haze H, distance t, distance T, and light energy of light source (light exposure) in the light exposure step.

In the development step, a solvent which dissolves the photosensitive resin composition constituting the photosensitive film is used as a developing solution to remove portions of the photosensitive film other than those insolubilized by the light exposure (negative type). Alternatively, portions solubilized by the light exposure are removed (positive type). In both cases, the surface of the photosensitive film formed on the substrate (surface on the side opposite to the side of the substrate) can be developed to form fine concaves or convexes on the surface. Then, portions of the photosensitive film not removed and remained are further cured as required. When the substrate is not used, one surface of the photosensitive film, for example, the surface thereof on the mask member side, may be adhered to another substrate after the light exposure step and before the development step. Moreover, even when a substrate is used, the substrate may be disposed on the opposite side of the mask member, then after light exposure from the photosensitive film side, the surface of the photosensitive film on the mask member side may be adhered to another substrate, and the original substrate may be delaminated after the light exposure step and before the development step.

Hereafter, the materials used for carrying out the method for producing convexes and concaves of the present invention will be explained.

Although the photosensitive film 10 may be one produced as a solid film consisting only of a photosensitive resin composition, it is preferable to use one prepared by applying a photosensitive resin composition on the substrate 11 or the light diffusing layer 30 and drying it, or by disposing the photosensitive film in contact with the substrate 11 or the light diffusing layer 30. When it is formed on the substrate 11 or the light diffusing layer 30, the photosensitive film 10 may be in a solid or liquid state.

As the photosensitive resin composition for forming the photosensitive film 10, resists and photo-curing resins generally used in the field of photolithography can be used. Examples of resins insolubilized or solubilized by light include photosensitive polymers obtained by introducing a photosensitive group such as cinnamate residue, chalcone residue, acrylate residue, diazonium salt residue, phenylazide residue, o-quinoneazide residue, coumarin residue, 2,5-dimethoxystilbene residue, stylylpyridine residue, α-phenylmaleimide, anthracene residue and pyrone residue into polyvinyl alcohols, novolac resins, acrylate type resins, epoxy type resins, and so forth.

Further, as the photo-curing resin, photopolymerizable prepolymers which are cured by crosslinking upon light irradiation can be used. Examples of the photopolymerizable prepolymers include resins having acrylate groups such as epoxy type acrylate, polyester type acrylate, polyurethane type acrylate and polyhydric alcohol type acrylate, polythiol-polyene resins, and so forth. Although the photopolymerizable prepolymers may be used alone, photopolymerizable monomers may be added in order to improve the crosslinking-curable property and strength of film cured by crosslinking. Used as the photopolymerizable monomers are one or two or more kinds of monofunctional acrylic monomers such as 2-ethylhexyl acrylate, 2-hydroxyethyl acrylate, 2-hydroxypropyl acrylate and butoxyethyl acrylate, bifunctional acrylic monomers such as 1,6-hexanediol acrylate, neopentylglycol diacrylate, diethylene glycol diacrylate, polyethylene glycol diacrylate, and hydroxypivalic acid ester neopentylglycol diacrylate, polyfunctional acrylic monomers such as dipentaerythritol hexaacrylate, trimethylpropane triacrylate and pentaerythritol triacrylate, and so forth.

The photosensitive resin composition may contain a photopolymerization initiator, ultraviolet sensitizing agent, or the like, as required, in addition to the photosensitive polymer or the photopolymerizable prepolymer and the photopolymerizable monomer mentioned above. Usable as the photopolymerization initiator are radical type photopolymerization initiators such as those of benzoin ether type, ketal type, acetophenone type and thioxanthone type, cation type photopolymerization initiators such as those of diazonium salts, diaryliodonium salts, triarylsulfonium salts, triarylbilirium salts, benzylpyridinium thiocyanate, dialkylphenacylsulfonium salts, dialkylhydroxyphenylsulfonium salts and dialkylhydroxyphenylphosphonium salt, complex type of these, and so forth. As the ultraviolet sensitizing agent, n-butylamine, triethylamine, tri-n-butylphosphine, and so forth can be used.

When the material on which surface convexes and concaves are formed is used as it is as an optical member such as a light diffusing film and a light control film, it is preferable to use a highly light transmitting material for the photosensitive film. As such a material, acrylics type resins are especially preferred among the photosensitive resins mentioned above. When convexes and concaves formed on the photosensitive film are used as a mold, or depending on the use of the member on which surface convexes and concaves are formed, the photosensitive film may be colored.

Thickness of the photosensitive film 10 is not particularly limited, and it is sufficient that it should be thicker than the height of convex (depth of concave) to be formed.

The material of the substrate 11 is not particularly limited so long as a material showing transmissivity for light used for the light exposure is chosen, and a plate or film consisting of glass, plastics or the like can be used. Specifically, usable are plastic films or sheets of polyethylene terephthalate, polybutylene terephthalate, polyethylene naphthalate, polycarbonate, polypropylene, polyethylene, polyarylate, acrylic resin, acetyl cellulose, polyvinyl chloride, or the like. In view of dimensional stability, those subjected to stretching, in particular, biaxial stretching, are especially preferred.

Thickness of the substrate 11 is for giving intervals between the light-shielding surface 20a of the mask member 20 and the photosensitive film 10 and between the surface of the light diffusing layer 30 on the photosensitive film side and the photosensitive film 10, and it is suitably selected depending on the convexes or concaves to be formed on the photosensitive film 10.

Although the light diffusing layer may be used as an independent light diffusing layer, when it is difficult to handle it as an independent light diffusing layer, it may be formed on a substrate. As the substrate, those exemplified as the substrate of the mask member can be used, and it may be a substrate also serving as the substrate of the mask member, as shown in FIG. 3(b). The light diffusing layer comprises spherical microparticles and a binder resin.

As the spherical microparticles, inorganic microparticles such as those of silica, alumina, talc, zirconia, zinc oxide, and titanium dioxide, and organic microparticles such as those of polymethyl methacrylate, polystyrene, polyurethane, benzoguanamine, and silicone resin can be used. Organic microparticles are particularly preferred in view of ease of obtaining spherical shape.

Mean particle diameter of the spherical microparticles should differ also depending on the objective convex or concave shape. If it is not desired to roughen surface of convex or concave shape, the spherical microparticles preferably have a mean particle diameter of 1/10 of the mask diameter (diameter of aperture) of the mask member or smaller, and the spherical microparticles are more preferably those having a mean particle diameter of 1 μm or smaller and also satisfying such a requirement as mentioned above. If it is desired to roughen surface of convex or concave shape to the contrary, the spherical microparticles preferably have a mean particle diameter exceeding 1/10 of the mask diameter (diameter of aperture) of the mask member, and the spherical microparticles are more preferably those having a mean particle diameter of 1 μm or larger and also satisfying such a requirement as mentioned above. By roughening surface of convex or concave shape, glares can be made to be unlikely to occur in use as a light control film, and light diffusing property can be improved in use as a light diffusing plate.

The binder resin may be one that is transparent and can uniformly retain the spherical microparticles in a dispersed state, and it is not limited to solid and may be a fluid such as liquid or liquid crystal. However, in order to maintain shape of the light diffusing layer by itself, it is preferably glass or a polymer resin.

Glass is not particularly limited so long as the light transmission property of the light diffusing layer is not lost. Examples of glass generally used include oxide glass such as silicate glass, phosphate glass and borate glass, and so forth. The polymer resin is not particularly limited so long as a polymer resin which does not degrades light transmissivity of the light diffusing layer is chosen, and usable as the polymer resin are thermoplastic resins, thermosetting resins, ionizing radiation hardening resins, such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, and fluorocarbon resins, and so forth.

Haze H of the light diffusing layer is preferably 60% or smaller, more preferably 5 to 50%, as described above. The haze can be adjusted by changing difference in refractive index between the spherical microparticles and the binder resin, mean particle diameter of the spherical microparticles, content of the spherical microparticles, and thickness of the light diffusing layer. The haze include internal haze and external haze, and it is preferred that both surfaces of the light diffusing layer are made substantially smooth (arithmetic mean roughness Ra according to JIS B0601:2001 is 0.30 μm or smaller, preferably 0.15 μm or smaller) so as not to substantially generate external haze. By making both surfaces of the light diffusing layer substantially smooth, the distance t and the distance T can be made uniform. If both surfaces of the light diffusing layer are made unsmooth, external haze is generated, and the distance t and the distance T locally change at the same time. By using such local change of the distance t and the distance T, locally different convex or concave shapes can also be produced even if the same mask pattern is used over the surface.

Furthermore, by changing thickness of the light diffusing layer or the like, one-dimensional or two-dimensional gradient of haze may be imparted to the light diffusing layer. It can be thereby made possible to produce an optical member or the like having concave or convex shapes having one-dimensionally or two-dimensionally changing shapes.

As the mask member 20, photomasks generally used in the field of photolithography can be used. When the photosensitive film is that of negative type, a mask member 20 in which many fine apertures (holes) corresponding to the objective pattern are formed is used, and when the photosensitive film is that of positive type, a mask 20 member on which light-shielding pattern corresponding to the objective pattern is formed is used. The aperture or light-shielding portion may have, for example, a circular shape or an elliptical shape, but the shape is not limited to them. The aperture or light-shielding portion may have a shape of elongated slit. The arrangement of the apertures or light-shielding portions may different depending on the objective pattern, and it may be random or regular arrangement. The shape of the bottom of convex or concave becomes substantially the same as that of the shape of the aperture or light-shielding portion of the mask member 20.

Since the mask diameter (aperture diameter) of the mask member 20 differs depending on use, it cannot be generally defined. In this specification, the mask diameter means diameter of circular aperture, minor axis length of elliptic aperture, or the shortest side length of a quadrangle circumscribed about an aperture of irregular shape. In the case of slit-like aperture, the mask diameter means shorter side length of the slit.

The light source 40 may be one emitting light of a wavelength for which the photosensitive resin composition mentioned above shows photosensitivity. Specifically, when a photosensitive resin reacting to ultraviolet radiation is used, UV ramps such as high pressure mercury vapor lamp, metal halide lamp and xenon lamp can be used.

When the photosensitive film on which fine convexes and concaves are produced by the method for producing surface convexes and concaves of the present invention (called member having surface convexes and concaves) is transparent, it can be used as it is as an optical member, or used in combination with another optical member. Alternatively, as shown in FIG. 9, it is also possible to further produce an electrocasting mold 60 by using a member having surface convexes and concaves 50 produced by the method for producing surface convexes and concaves of the present invention as a mold and produce a large number of members 70 having the same surface shape as that of the member having surface convexes and concaves with an arbitrary material by using the electrocasting mold 60. Specifically, a conductive film 51 is formed on the surface of the member having surface convexes and concaves 50 by sputtering or the like, then an electrocasting layer is formed on the surface of the conductive film 51 by a usual electrocasting method, and the member having surface convexes and concaves 50 is removed to produce the electrocasting mold 60. This electrocasting mold 60 is filled with, for example, a photo-curing resin 71, then covered with a transparent film 72, and irradiated with light through the film 72 to cure the photo-curing resin 71 and thereby form a member 70 having the same convexes and concaves as the surface convexes and concaves serving as an original.

Since the range of material selection is widened by using such an electrocasting mold 60, a material having superior characteristics required for a specific objective use (for example, optical member) can be chosen to easily produce a lot of the objective members on which convexes and concaves are highly precisely formed. For example, by using a transparent material as the material to be filled in the mold, optical members such as light diffusing plates, light control films and microlenses can be produced.

EXAMPLES

Hereafter, the present invention will be further explained with reference to examples.

Example 1

On a substrate 11 consisting of a polyester film having a thickness of 50 μm (COSMOSHINE A4300, Toyobo, Co., Ltd., refractive index: 1.64), negative type resist (EKIRESIN PER-800 RB-2203, Goo Chemical Co., Ltd.) was applied and dried to form a photosensitive film 10 having a thickness of 100 μm.

Separately, on a substrate 31 consisting of a polyester film having a thickness of 50 μm (COSMOSHINE A4300, Toyobo, Co., Ltd., refractive index: 1.64), a coating solution a for light diffusing layer having the following composition was applied and dried to form a light diffusing layer 30 having a thickness of 5 μm and a haze of 8%. The binder resin of the light diffusing layer 30 had a refractive index of 1.54.

| <Coating solution a for light diffusing layer> | |
|---|---|
| Acrylic resin (ACRYDIC A-807, Dainippon Ink & Chemicals Inc. solid content: 50%) | 100 parts |
| Spherical microparticles (silica, Tospearl 105, GE Toshiba Silicones Co., Ltd., refractive index: 1.43, mean particle size: 0.5 μm) | 4.3 parts |
| Curing agent (Takenate D110N, Mitsui Chemicals Polyurethane Inc., solid content: 60%) | 19.5 parts |
| Ethyl acetate | 100 parts |
| Toluene | 100 parts |

Then, the above laminates were superimposed so that the substrate 11 for the photosensitive film 10 and the light diffusing layer 30 should face each other. Further, the superimposed laminates and a chromium mask 20 having multiple circular apertures (henceforth referred to as Cr mask) were superimposed so that the surface of the light diffusing layer 30 on the substrate 31 side and a light-shielding surface 20a of the Cr mask should face each other (FIG. 10), and light exposure was performed from the Cr mask side under the following conditions. As the Cr mask, two kinds of Cr masks having mask diameters of 30 μm and 40 μm were prepared, and light exposure was performed by using each of the masks.

<Light Exposure and Development>

The light exposure was performed by using a light exposure apparatus using a high pressure mercury vapor lamp as a light source (Jet Light JL-2300, ORC Manufacturing Co., Ltd.) with paralleling the light. The Cr mask was disposed so that light should be perpendicularly irradiated on the mask surface. Light amount for exposure was 100 mJ/cm$^2$, which was measured for light mainly of 365 nm with an integrating actinometer (UIT-102 (light receiving part: UVD-365PD), USHIO, INC.).

After the light exposure, development was performed with a developing solution (1% aqueous solution of sodium carbonate), then the laminate was washed with running water, and dried to obtain a sample on which convexes (convexes corresponding to exposed portions) were formed on the substrate surface.

Examples 2 to 5

Samples in which convexes were formed on the substrate surfaces were obtained in the same manner as that used in Example 1 except that thickness of the polyester film serving as the substrate 11 for the photosensitive film 10, thickness of the polyester film serving as the substrate 31 for the photosensitive film 30, and haze of the light diffusing layer 30 were changed as shown in Table 1. In Examples 2 to 5, in order to obtain the haze values of 16%, 26% and 33%, amount of the spherical microparticles in the coating solution for light diffusing layer was changed to 9.9 parts, 18.5 parts, and 27.2 parts, respectively, with using a fixed thickness of the light diffusing layer of 5 μm.

Example 6

A sample in which convexes (convexes corresponding to exposed portions) were formed on a substrate surface was obtained in the same manner as that used in Example 1, except that the same thickness of the polyester film serving as the substrate 11 of the photosensitive film 10, thickness of the polyester film serving as the substrate 31 of the light diffusing layer 30 and haze of the light diffusing layer 30 as those of Example 5 were used, the structure of the laminate was changed so that the substrate 11 of the photosensitive film 10 and the substrate 31 of the light diffusing layer 30 should face each other (FIG. 11), and the chromium mask 20 (henceforth referred to as Cr mask) was superimposed so that the surface of the light diffusing layer 30 side and the light-shielding surface 20a of the Cr mask should face each other.

Examples 7 to 9

Samples in which convexes (convexes corresponding to exposed portions) were formed on a substrate surface were obtained in the same manner as that used in Example 1, except that the same thickness of the polyester film serving as the substrate 11 of the photosensitive film 10, thickness of the polyester film serving as the substrate 31 of the light diffusing layer 30 and haze of the light diffusing layer 30 as those of Example 2 were used, and an interval was provided between the surface of the light diffusing layer 30 on the substrate 31 side and the light-shielding surface 20a of the chromium mask 20 (henceforth referred to as Cr mask) (FIG. 12). The interval was formed with an air layer, and sizes of the interval were as shown in Table 1.

Values of the distance t and the distance T used in Examples 1 to 9 are also shown in Table 1. Further, the values of t/n, wherein n is refractive index of the medium present between the surface of the light diffusing layer on the photosensitive film side and the photosensitive film, and T/N, wherein N is refractive index of the medium present between the light-shielding surface of the mask member and the photosensitive film, are also shown in Table 1.

TABLE 1

| | Thickness of substrate 11 | Thickness of substrate 31 | Interval | Haze (H) | Distance (t) | t/n | Distance (T) | T/N |
|---|---|---|---|---|---|---|---|---|
| Example 1 | 50 μm | 50 μm | — | 8% | 50 μm | 30 μm | 105 μm | 64 μm |
| Example 2 | 50 μm | 50 μm | — | 16% | 50 μm | 30 μm | 105 μm | 64 μm |
| Example 3 | 50 μm | 50 μm | — | 33% | 50 μm | 30 μm | 105 μm | 64 μm |
| Example 4 | 50 μm | 150 μm | — | 26% | 50 μm | 30 μm | 205 μm | 125 μm |
| Example 5 | 100 μm | 100 μm | — | 26% | 100 μm | 61 μm | 205 μm | 125 μm |
| Example 6 | 100 μm | 100 μm | — | 26% | 200 μm | 122 μm | 205 μm | 125 μm |
| Example 7 | 50 μm | 50 μm | 250 μm | 16% | 50 μm | 30 μm | 355 μm | 314 μm |
| Example 8 | 50 μm | 50 μm | 500 μm | 16% | 50 μm | 30 μm | 605 μm | 564 μm |
| Example 9 | 50 μm | 50 μm | 750 μm | 16% | 50 μm | 30 μm | 855 μm | 814 μm |

The surface profiles of the samples obtained in Examples 1 to 9 were measured with a laser microscope (VK-9500, KEYENCE CORP.). Sectional shapes of the convexes obtained in Examples 1 to 3 are shown in FIG. 4 (those obtained in Examples 1, 2 and 3 are shown in the upper row, middle row and lower row of FIG. 4, respectively), those obtained in Examples 4 to 6 are shown in FIG. 5 (those obtained in Examples 4, 5 and 6 are shown in the upper row, middle row and lower row of FIG. 5, respectively), and those obtained in Examples 7 to 9 are shown in FIG. 6 (those obtained in Examples 7, 8 and 9 are shown in the second row, third row and fourth row of FIG. 6, respectively). As references, sectional shapes of the convexes obtained in Example 2 are shown in the first row of FIG. 6.

In Examples 1 to 3, the distance t (t/n) and the distance T (T/N) were fixed, and the value of haze H was changed. As shown in FIG. 4, spread of light became larger with increase of the value of haze H, therefore height of the convexes in the samples obtained in Examples 1 to 3 became lower and length of the slope became longer with increase of the value of haze H.

In Examples 4 to 6, the haze H and the distance T (T/N) were fixed, and the distance t (t/n) was changed. As shown in FIG. 5, spread of light became larger with increase of the distance t (t/n), and therefore height of the convexes in the samples obtained in Examples 4 to 6 became slightly lower with increase of the distance t (t/n).

It is considered that as the distance t (t/n) becomes larger, slope of convex shape should become larger. However, it is considered that, in the results shown in FIG. 5, when the distance t was 200 μm (t/n was 122 μm), the amount of light did not reach the critical light exposure at portions around the end of slope, and therefore the slope was not so long as that formed with a distance t of 50 μm or 100 μm (t/n was 30 μm or 61 μm).

In Examples 7 to 9, the haze H and the distance t (t/n) were fixed, and the value of distance T (T/N) was changed. As shown in FIG. 6, it can be seen that tendency of change of the convex shapes obtained in Examples 7 to 9 differed depending on the mask diameter. When the mask diameter was 30 μm, peak of convex markedly tended to be more sharpened with increase of the distance T (T/N). Moreover, height of convex increased until the distance T reached 605 μm (T/N=564 μm), but decreased when the distance T exceeded that length. On the other hand, when the mask diameter was 40 μm, the peak sharpening tendency of convex was also seen, and height of the convex also increased with increase of the distance T (T/N). These phenomena were caused by diffraction of light passing through the circular aperture of the mask.

Example 10

The procedures of Examples 1 to 9 up to the light exposure were repeated except that the substrate 11 for the photosensitive film 10 was changed to a polyester film having a thickness of 100 μm (trade name: Lumirror T60, Toray Industries, Inc., refractive index: 1.64). After completion of the light exposure, the polyester film was delaminated, and the surface of the photosensitive film 10 exposed by the delamination was adhered to an aluminum plate with adhesive. Then, development, washing with water and drying were performed in the same manner as that of Examples 1 to 9 to obtain 9 kinds of samples of aluminum plate on which surface convexes and concaves were formed.

The surface profiles of the samples obtained in this example were substantially the same as those obtained under the same conditions in Examples 1 to 9. These results demonstrated that convexes and concaves could be formed on another substrate by adhering a surface of the photosensitive film 10 on the mask member side to the other substrate after the light exposure and performing the development. Therefore, it is possible to form convexes and concaves even on a substrate which does not transmit light by using this method.

Example 11

On the surfaces having convexes and concaves of the samples produced in Examples 1 to 9, a two-pack type curable silicone resin (KE-108, curing agent: CAT-108, Shin-Etsu Chemical Co., Ltd.) was poured and cured, and then the surface having convexes and concaves was delaminated to obtain silicone resins on which surface convexes and concaves were formed.

The surface convexes and concaves of the silicone resins obtained in this example had shapes of convexes and concaves complementary to the original surface convexes and concaves.

Example 12

On a surface of each sample produced in Examples 1 to 9, a nickel thin film 51 was formed by sputtering as shown in FIG. 9 to make the surface conductive. On this surface, a nickel layer 60 was formed by a usual nickel electrocasting method. The surface of this nickel layer had convex and concave shapes complementary to those of the original surface convexes and concaves. Furthermore, by filling this nickel layer 60 as a mold with the photo-curable resin 71, covering it with a transparent polyester film 72, and irradiating light through the polyester film to cure the photo-curable resin 71, a convexo-concave profile having the same convexes and concaves as those of the original surface convexes and concaves could be formed on the polyester film 72.

Figure 1:
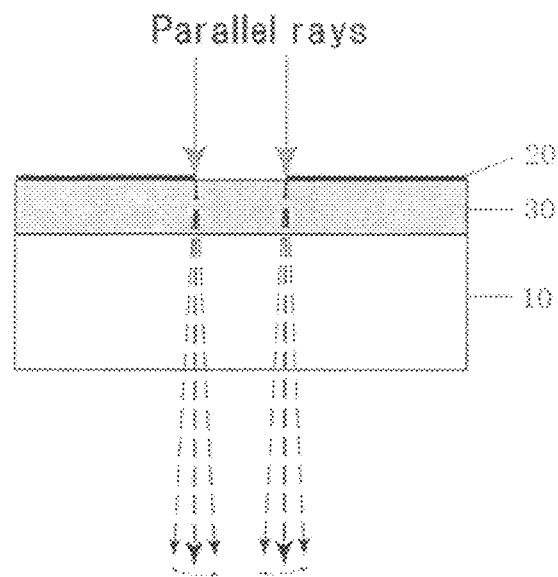
FIG. 1 Diagram for explanation of the principle of the formation of convexes and concaves according to the present invention FIG. 2 Diagram for explanation of the principle of the formation of convexes and concaves according to the present invention FIG. 3 Diagram showing an embodiment of the method for producing surface convexes and concaves of the present invention FIG. 4 Graphs showing change of convex shape depending on haze H with fixed distance T and distance t FIG. 5 Graphs showing change of convex shape depending on distance t with fixed haze H and distance T FIG. 6 Graphs showing change of convex shape depending on distance T with fixed haze H and distance t FIG. 7 Graphs showing change of distribution of transmitted light intensity depending on distance T FIG. 8 Microphotographs showing specific examples of convexes having different shapes and aspect ratios FIG. 9 Diagram showing another embodiment of the method for producing surface convexes and concaves of the present invention FIG. 10 Diagram showing one step of the method for producing surface convexes and concaves of the present invention FIG. 11 Diagram showing one step of the method for producing surface convexes and concaves of the present invention FIG. 12 Diagram showing one step of the method for producing surface convexes and concaves of the present invention
Figure 2:
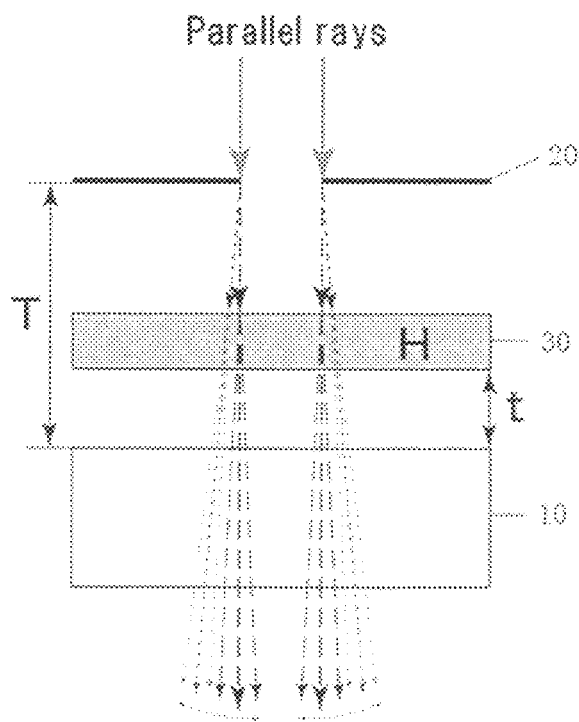
Figure 3:
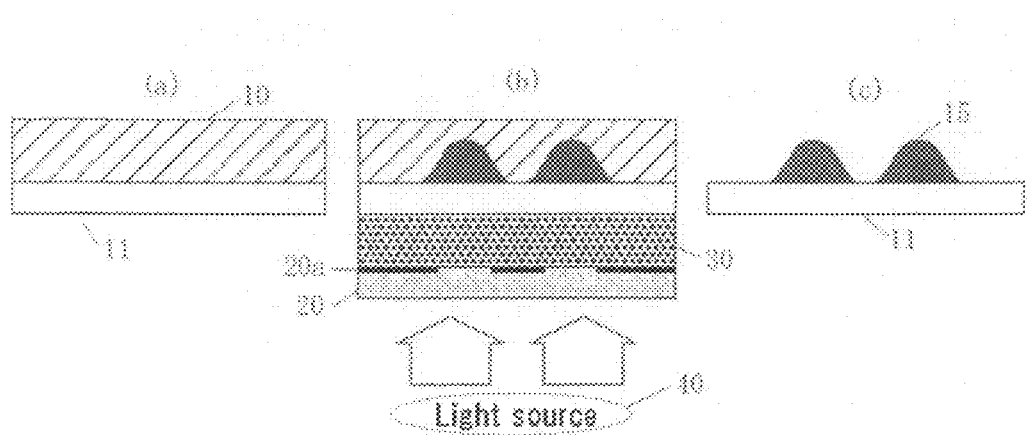
Figure 4:
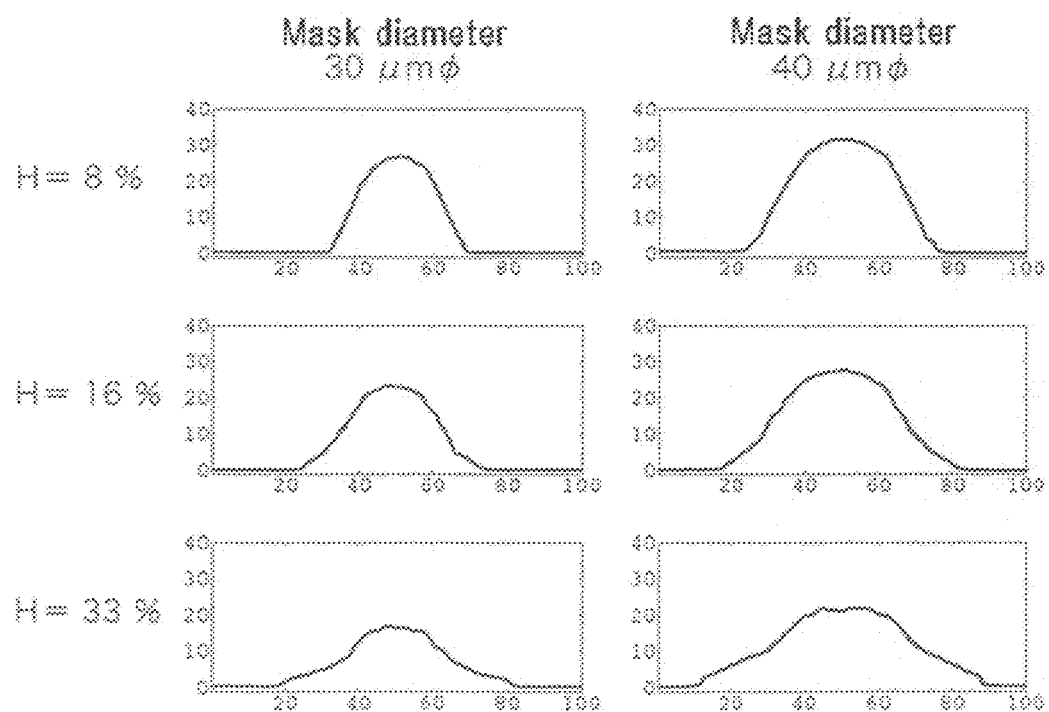
Figure 5:
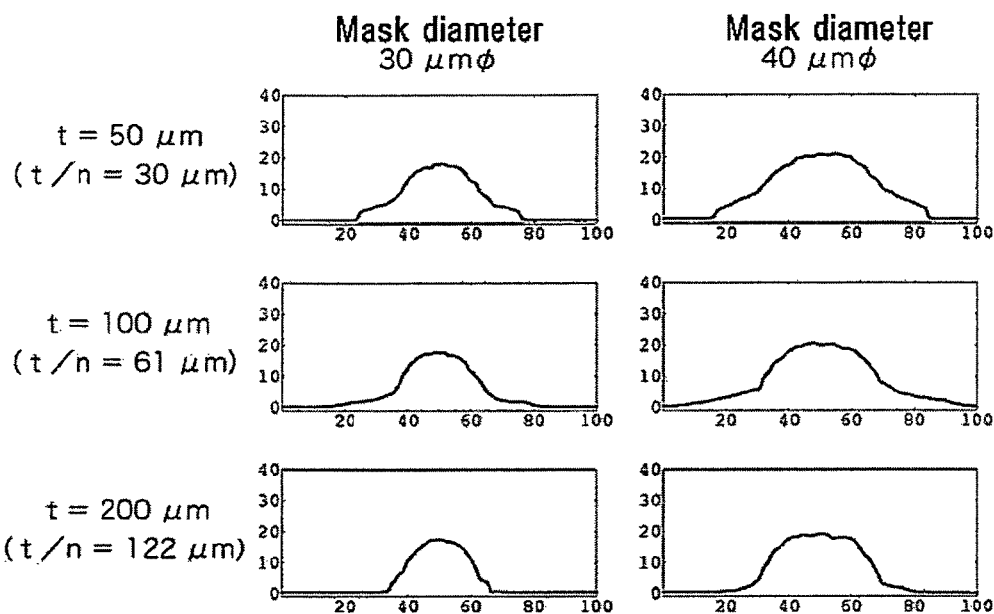
Figure 6:
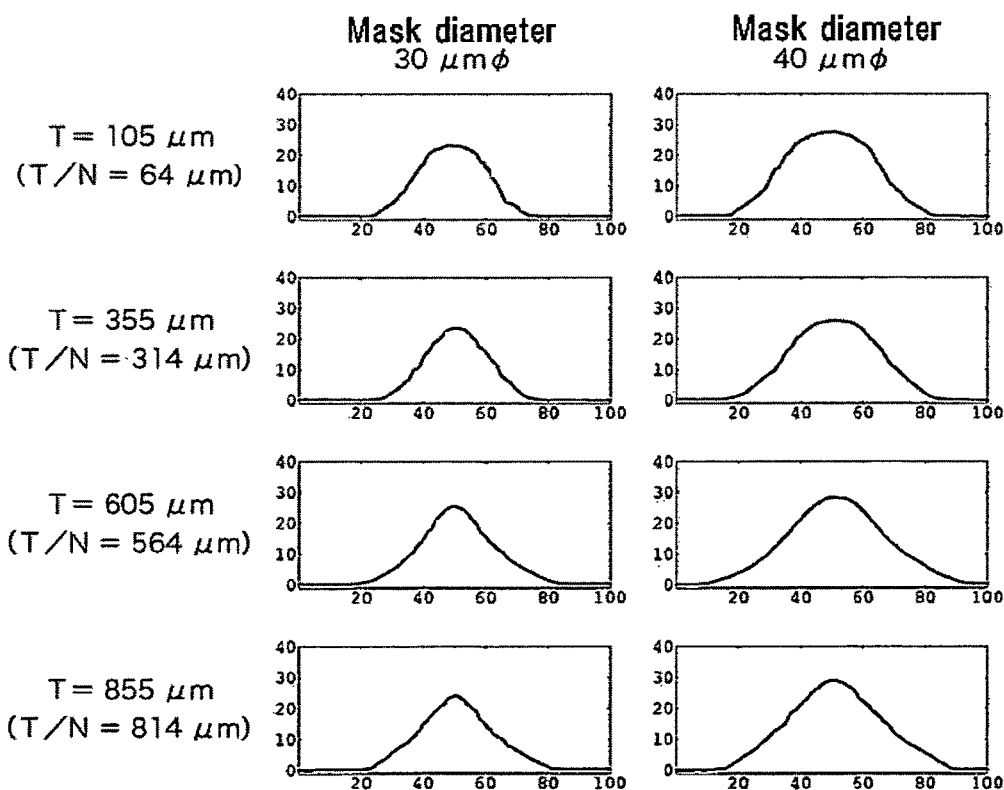
Figure 7:
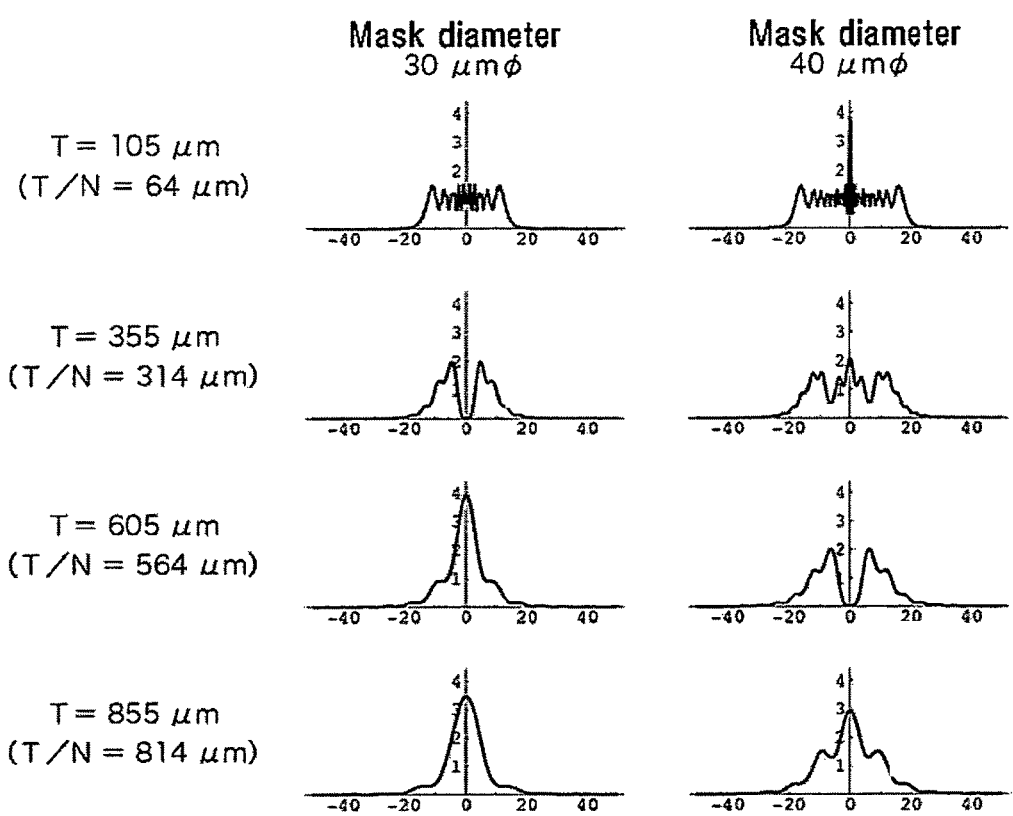
Figure 8:
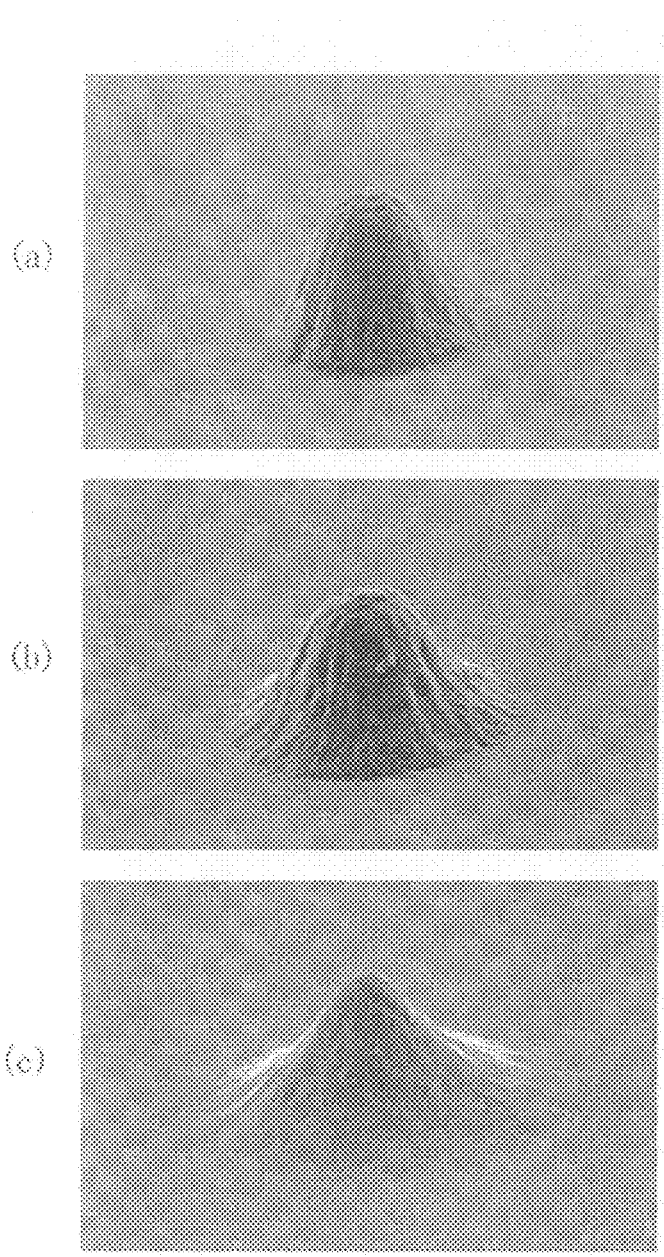
Figure 9:
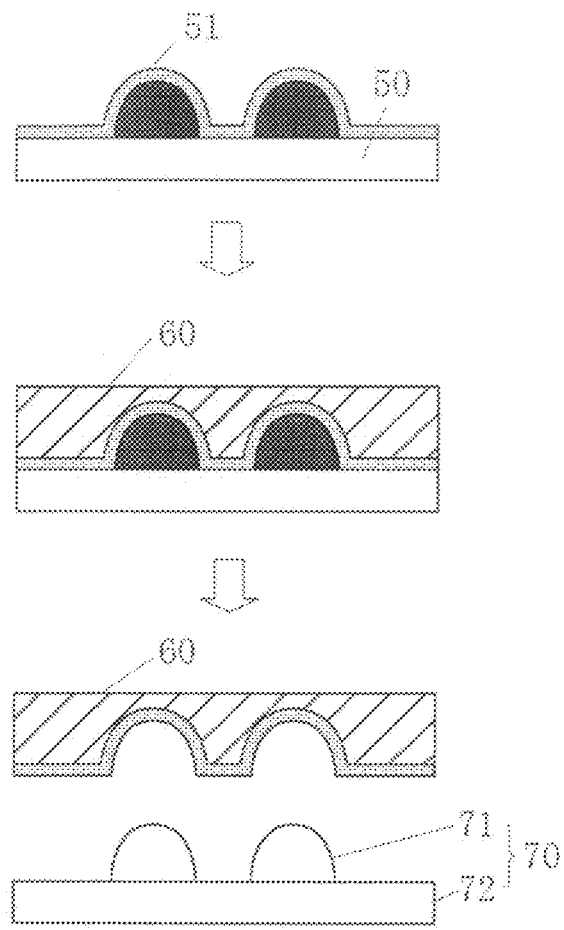
Figure 10:
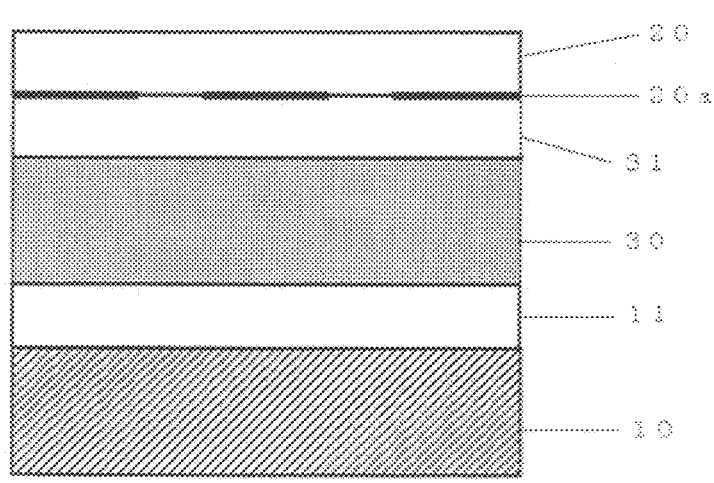
Figure 11:
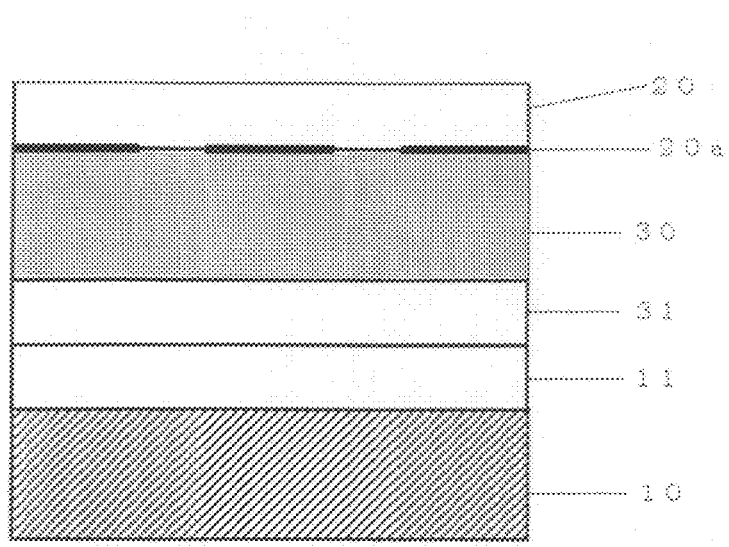
Figure 12:
Figure 12:
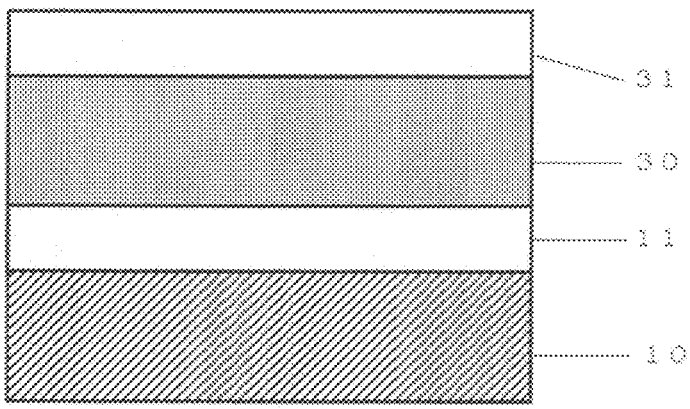

| Explanations of numerals | |
| --- | --- |
| 10 | Photosensitive film, |
| 11, 31 | substrate, |
| 20 | mask member, |
| 30 | light diffusing layer, |
| 40 | light source. |

The invention claimed is:
1. A method for producing fine convexes and concaves on a surface of a material, which comprises:
disposing a mask member having light transmitting sections and non-light transmitting sections over one side of a photosensitive film consisting of a photosensitive resin composition, with the mask member spaced from the photosensitive film,
determining parameters which, in combination, provide a desired shape for the convexes and concaves, the parameters including haze (JIS K7 136:2000) of a light diffusing layer of 33% 60%-or less, distance from the light-shielding surface of the mask member to the photosensitive film, and distance between the photosen- sitive film and the surface of the light diffusing layer facing the photosensitive film, disposing the light diffusing layer having the determined haze between the mask member and the photosensitive film with the photosensitive film spaced from the facing surface of the light diffusing layer by the determined distance, exposing the photosensitive film to light from a light source disposed on the side of the mask member through the light transmitting sections of the mask member, and removing exposed portions or unexposed portions of the photosensitive film by development to produce convexes and concaves on the photosensitive film in the desired shapes corresponding to shapes of the exposed portions or unexposed portions.

2. The method for producing surface convexes and concaves according to claim 1, wherein:

the light diffusing layer consists of spherical microparticles and a binder resin, and mean particle diameter of the spherical microparticles is 1/10 or less of masking diameter of the mask member.

3. The method for producing surface convexes and concaves according to claim 1, wherein:

the photosensitive film consists of a negative type photosensitive resin composition which is insolubilized by light exposure.

4. The method for producing surface convexes and concaves according to claim 1, wherein:

the photosensitive film is formed on or disposed in contact with a substantially transparent substrate, and the light exposure is performed from the side of the substrate.

5. The method for producing surface convexes and concaves according to claim 1, wherein:

after the step of light exposure, the surface of the photosensitive film on the mask member side is adhered to a substrate, and then development is performed to produce a surface having convexes and concaves on the substrate.

6. The method for producing surface convexes and concaves of according to claim 1, wherein the member on which surface convexes and concaves are formed is an optical member.

7. The method for producing surface convexes and concaves according to claim 1, wherein:

in the step of exposing the photosensitive film to light, haze of the light diffusing layer is within a range from 5% to 33%.

8. A method for producing a member having surface convexes and concaves by using a mold having fine surface convexes and concaves so that the member should have surface convexes and concaves in shapes complementary to shapes of the surface convexes and concaves of the mold, wherein:

the mold is produced by disposing a mask member having light transmitting sections and non-light transmitting sections over one side of a photosensitive film consisting of a photosensitive resin composition, with the mask member spaced from the photosensitive film, determining parameters which, in combination, provide a desired shape for the convexes and concaves, the parameters including haze (JIS K7 136:2000) of a light diffusing layer of 33% 60%-or less, distance from the light-shielding surface of the mask member to the photosensitive film, and distance between the photosensitive film and the surface of the light diffusing layer facing the photosensitive film, disposing the light diffusing layer having the determined haze between the mask member and the photosensitive film with the photosensitive film spaced from the facing surface of the light diffusing layer by the determined distance, exposing the photosensitive film to light from a light source disposed on the side of the mask member through the light transmitting sections of the mask member, and removing exposed portions or unexposed portions of the photosensitive film by development to produce convexes and concaves on the photosensitive film in the desired shapes corresponding to shapes of the exposed portions or unexposed portions.

9. A method for producing a member surface convexes and concaves by using a mold having fine surface convexes and concaves so that the member should have surface convexes and concaves in shapes complementary to shapes of the surface convexes and concaves of the mold, wherein:

a first mold is produced by disposing a mask member having light transmitting sections and non-light transmitting sections over one side of a photosensitive film consisting of a photosensitive resin composition, with the mask member spaced from the photosensitive film, determining parameters which, in combination, provide a desired shape for the convexes and concaves, the parameters including haze (JIS K7 136:2000) of a light diffusing layer of 33% 60%-or less, distance from the light-shielding surface of the mask member to the photosensitive film, and distance between the photosensitive film and the surface of the light diffusing layer facing the photosensitive film, disposing the light diffusing layer having the determined haze between the mask member and the photosensitive film with the photosensitive film spaced from the facing surface of the light diffusing layer by the determined distance, exposing the photosensitive film to light from a light source disposed on the side of the mask member through the light transmitting sections of the mask member, and removing exposed portions or unexposed portions of the photosensitive film by development to produce convexes and concaves on the photosensitive film in the desired shapes corresponding to shapes of the exposed portions or unexposed portions a second mold is produced using the first mold and is then used to produce a member having surface convexes and concaves in the same shapes as those of the first mold.

10. A method for producing fine convexes and concaves on a surface of a material, which comprises:

the step of disposing a mask member having light transmitting sections and non-light transmitting sections over one side of a photosensitive film consisting of a photosensitive resin composition with an interval with respect to the photosensitive film and disposing a light diffusing layer having a haze of 60% or less between the mask member and the photosensitive film, the step of exposing the photosensitive film to light from a light source disposed on the side of the mask member through the light transmitting sections of the mask member, and the step of removing exposed portions or unexposed portions of the photosensitive film by development to produce convexes and concaves on the photosensitive film in shapes determined by shapes of the exposed portions or unexposed portions, and wherein distance from a surface of the light diffusing layer on the photosensitive film side to the photosensitive film varies one-dimensionally or two-dimensionally along the photosensitive film; and wherein distance from light-shielding surface of the mask member to the photosensitive film varies one-dimensionally or two-dimensionally along the photosensitive film.

11. The method for producing surface convexes and concaves according to claim 10, wherein:

thickness of the light diffusing layer is one-dimensionally or two-dimensionally changed with respect to the light diffusing layer itself.

* * * * *